(12) United States Patent
Wu

(10) Patent No.: US 6,865,627 B2
(45) Date of Patent: Mar. 8, 2005

(54) REGULATING REAL-TIME DATA CAPTURE RATES TO MATCH PROCESSOR-BOUND DATA CONSUMPTION RATES

(75) Inventor: Yee J. Wu, Bothell, WA (US)

(73) Assignee: Microsoft Corp, Redmond, WA (US)

( * ) Notice: Subject to any disclaimer, the term of this patent is extended or adjusted under 35 U.S.C. 154(b) by 136 days.

(21) Appl. No.: 10/330,389

(22) Filed: Dec. 27, 2002

(65) Prior Publication Data

US 2004/0128411 A1 Jul. 1, 2004

(51) Int. Cl.$^7$ .............................. G06F 3/06; G06F 15/16
(52) U.S. Cl. .............................. 710/57; 710/52; 710/53; 709/231; 709/232; 709/233; 709/234
(58) Field of Search ............................... 710/52, 53, 55, 710/57; 709/231–234; 341/50; 725/134; 714/18

(56) References Cited

U.S. PATENT DOCUMENTS

| | | | | |
|---|---|---|---|---|
| 5,918,002 A | * | 6/1999 | Klemets et al. | 714/18 |
| 5,945,931 A | * | 8/1999 | Tahara et al. | 341/50 |
| 5,956,321 A | * | 9/1999 | Yao et al. | 709/234 |
| 6,014,706 A | * | 1/2000 | Cannon et al. | 709/231 |
| 6,292,834 B1 | * | 9/2001 | Ravi et al. | 709/233 |
| 6,415,326 B1 | * | 7/2002 | Gupta et al. | 709/231 |
| 6,601,009 B2 | * | 7/2003 | Florschuetz | 709/231 |
| 6,629,318 B1 | * | 9/2003 | Radha et al. | 725/134 |

* cited by examiner

Primary Examiner—Fritz Fleming
Assistant Examiner—Joshua D Schneider

(57) ABSTRACT

Systems and methods to regulate real-time data capture rates to match processor-bounded data consumption operations are described. In one aspect, a computer system is connected to a data source. A first transition time is determined for the data source to change from a first mode to a second mode. A second transition time is determined for the data source to change from the second mode to the first mode. Based on the first and second transition times, the data source is set into respective ones of the first and second modes. This is performed such that real-time capture of data from the data source is regulated by the computer system to substantially match processor-bound data consumption rates of an application consuming the data.

30 Claims, 6 Drawing Sheets

REGULATING REAL-TIME DATA CAPTURE RATES TO MATCH PROCESSOR-BOUND DATA CONSUMPTION RATES

TECHNICAL FIELD

The invention relates to the transfer and processing of data.

BACKGROUND

Digital video (DV) devices such as DV camcorders are enormously popular with amateur and professional videographers alike. One popular DV recording medium is tape magnetic tape such as "miniDV" tape, HI8 tape, and so on. For purposes of discussion, magnetic tape is hereinafter often referred to as "tape". Regardless of the specific type of tape that is used to record video data, which includes video and/or audio data, it is often desirable to transfer taped video data to different data storage media such as another tape, an optical disk, a hard drive, and/or the like. Existing techniques to transfer taped video data to different data storage media are substantially problematic in that they may result in DV data loss and/or under-use of available computing processing resources during data transfer operations. Techniques that address such problems during taped DV data transfer operations are desired.

SUMMARY

Systems and methods to regulate real-time data capture rates to match processor-bounded data consumption operations are described. In one aspect, a computer system is connected to a data source device. A first transition time is determined for the data source device to change from a first state to a second state. A second transition time is determined for the data source device to change from the second state to the first state. Based on the first and second transition times, the data source device is set into respective ones of the first and second states. This is performed such that real-time capture of data from the data source device is regulated by the computer system to substantially match processor-bound data consumption rates of an application consuming the data.

BRIEF DESCRIPTION OF THE DRAWINGS

The detailed description is described with reference to the accompanying figures.

DETAILED DESCRIPTION

Overview

Figure 1:
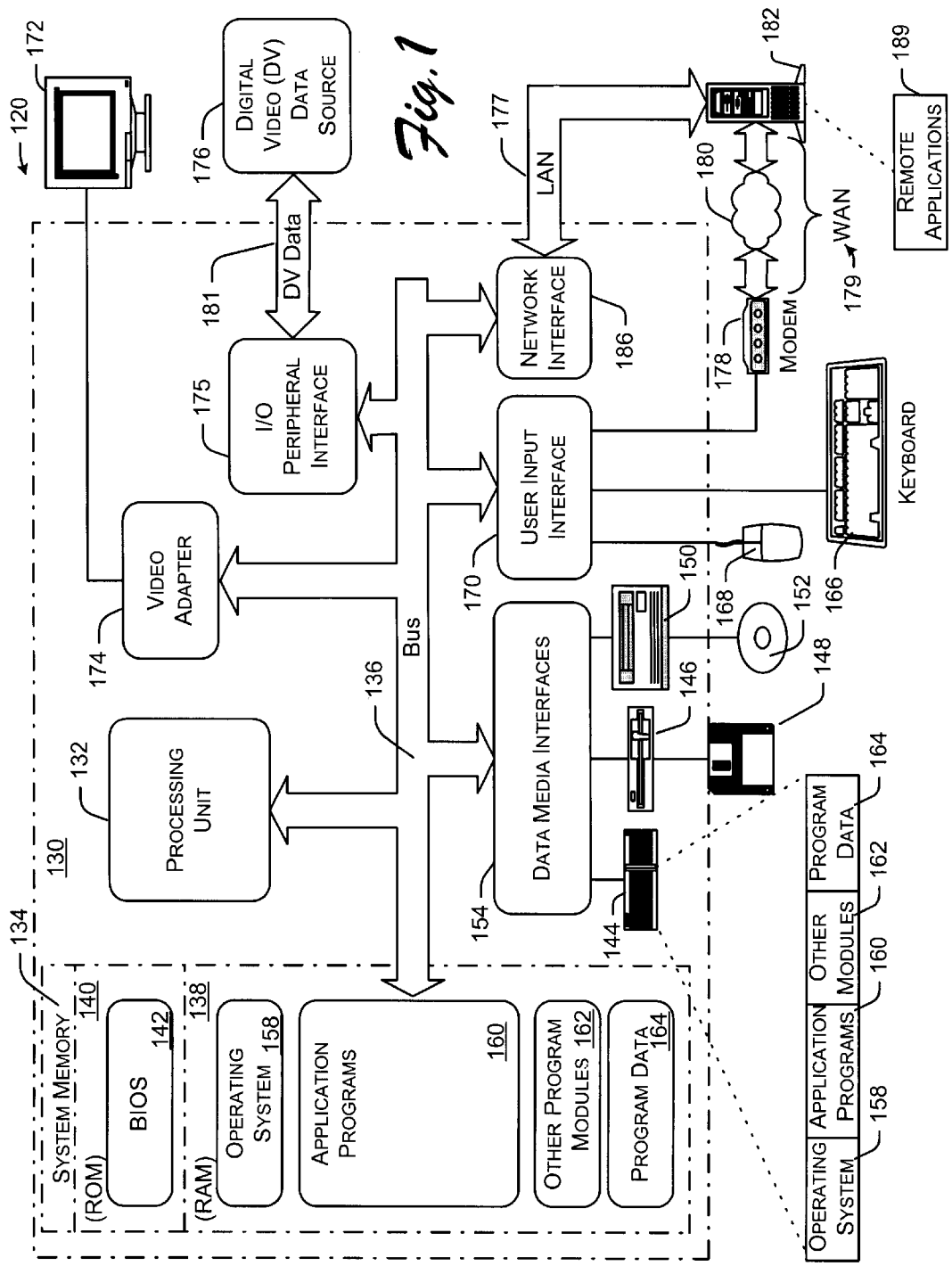
FIG. 1 is a block diagram showing an exemplary computing environment on which the described systems, apparatuses and methods may be implemented.

When taped video data is transferred from a DV data source such as a DV camcorder to different data storage media such as a hard disk drive, optical media, and/or the like, the taped video data is typically received by an input/output (I/O) controller in real-time. The data storage device is hosted by a computing device such as a general purpose PC, a handheld device, and/or the like. The computing device implements the I/O controller. Since the transferred DV data is received in real-time, the transferred data is received at a rate that is not restricted by computing device processing unit operations. Rather, the transferred data is typically only restricted as a function of the interconnection used to couple the DV data source to the computing device. As DV data is received by the I/O controller, the DV data is temporarily stored in one or more input buffers of finite size.

Transferred DV data in an input buffer is typically removed from the input buffer by one or more applications for processing before being stored on the target data storage media (e.g., optical storage, a different tape, a CD-ROM, and/or the like). Such processing operations include, for example, data compression, image processing, and/or other processing operations. For example, MPEG data compression is often used to compress transferred DV data prior to its storage onto an optical disk.

Such DV data processing operations are typically processor-bounded. This means that such operations will only remove transferred DV data from an input buffer as fast as the processor can execute application instructions and perform data transfers to/from memory to operate on the transferred DV data. Again, the input buffer is being continuously filled with DV data at real-time data rates. Thus, the input buffer will overflow if the DV data processing application cannot remove the transferred DV data from the input buffer fast enough, that is, before the input buffer is completely filled. When transferred DV data cannot be removed at such real-time rates, the input buffer overflows and transferred DV data is lost.

To address this problem, existing DV data transfer and processing operations such as data compression operations are typically performed serially, that is one after another, rather than at the same time (i.e., in parallel). Unfortunately, a computing device with limited data storage resources may not be able to store all transferred DV data that can be stored on a single tape. For example, an hour of DV data, which can generally be stored onto a single tape, typically requires up to thirteen (13) gigabytes (GB) of storage space.

This means that a computing device used to transfer an hour's worth of DV data onto another data storage media must have at least 13 GB of volatile and/or non-volatile memory available with which to store all of the transferred DV data. This amount of memory does not even take into account the additional amounts of memory that is required for the computing device to execute an application that will operate on the transferred DV data, for example, to compress the transferred DV data prior to storage on another storage media. Because of this onerous memory requirement, existing techniques either require costly and possibly prohibitive amount of memory to perform such transfer and data operations in serial. If less that ideal amounts of memory are available to perform such operations in serial, existing techniques require a user to perform multiple iterative download and DV data processing operations. Performing such operations iteratively and multiple times is considerably time consuming and labor intensive.

The following detailed systems and methods address each of these problems (i.e., input buffer overflow, onerous memory requirements, and so on), by regulating the flow of data transferred in real-time from a DV data source to match processor-bounded data consumption rates of an application that pre-processes transferred DV data prior to storage onto a different storage media. Regulated real-time data flow means that substantially unique data and non-substantially unique data, which is communicated in real-time from the DV data source to a computing device that hosts the application, is regulated as a function of input buffer conditions and DV data source operational criteria. DV data that is not substantially unique is DV data that is a repeat of a substantially unique frame of data that has already been communicated to a computing device that hosts the application consuming the transferred DV data. Such input buffer conditions include, for example, input buffer emptiness and fullness states (i.e., anticipated buffer underflow and overflow states). DV data source operational criteria include, for example, the amount of time it takes the input buffer I/O controller to determine that the DV data source has transitioned from a stop or pause states to a start or play state and vice-versa. (Input buffer underflow conditions generally result in under-utilization of computing device processing and memory resources).

By so regulating real-time DV data capture rates, the described systems and methods can perform real-time DV data transfers in-parallel with processor-bounded DV data consumption operations without losing portions of the transferred DV data in the process. Moreover, such operations are performed independent of the need for considerable amounts of potentially costly data storage resources that would otherwise be required to stem such problematic input buffer overflow conditions.

An Exemplary Operating Environment

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Program modules generally include routines, programs, objects, components, data structures, etc., that perform particular tasks or implement particular abstract data types.

FIG. 1 is a block diagram showing an exemplary computing environment 120 on which the described systems, apparatuses and methods may be implemented. Exemplary computing environment 120 is only one example of a suitable computing environment and is not intended to suggest any limitation as to the scope of use or functionality of systems and methods described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well known computing systems, environments, and/or configurations that may be suitable include, but are not limited to, including hand-held devices, multi-processor systems, microprocessor based or programmable consumer electronics, network PCs, minicomputers, mainframe computers, portable communication devices, and the like.

The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132. Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 138, and/or non-volatile memory, such as read only memory (ROM) 140. A basic input/output system (BIOS) 142, containing the basic routines that help to transfer information between elements within computer 130, such as during start-up, is stored in ROM 140. RAM 138 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more data media interfaces 154.

The drives and associated computer-readable media provide non-volatile storage of computer readable instructions, data structures, program modules, and other data for computer 130. Although the exemplary environment described herein employs a hard disk, a removable magnetic disk 148 and a removable optical disk 152, other types of computer readable media which can store data that is accessible by a computer, such as magnetic cassettes, flash memory cards, digital video disks, random access memories (RAMs), read only memories (ROM), and the like, may also be used in the exemplary operating environment. I A number of program modules may be stored on the hard disk, magnetic disk 148, optical disk 152, ROM 140, or RAM 138, including, e.g., an operating system 158, one or more application programs 160, other program modules 162, and program data 164. The systems and methods described herein to regulate DV capture rates to match processor-bounded application DV data consumption rates may be implemented within operating system 158, one or more application programs 160, and/or other program modules 162, which respectively operate on and/or generate portions of program data 164. Such program modules and program data are described in greater detail below in reference to FIGS. 2–5.

A user can provide commands and information into computer 130 through input devices such as keyboard 166 and pointing device 168 (such as a "mouse"). Other input devices (not shown) may include a microphone, joystick, game pad, satellite dish, serial port, scanner, camera, etc. Input devices are connected to the processing unit 132 through a user input interface 170 that is coupled to bus 136, but may be connected by other interface and bus structures, such as a parallel port, game port, a universal serial bus (USB), etc.

A monitor 172 or other type of display device is also connected to bus 136 via an interface, such as a video adapter 174. In addition to monitor 172, personal computers typically include other output devices (not shown), such as speakers and printers, which may be connected through I/O peripheral interface 175.

Exemplary computing environment 120 includes one or more DV data sources 176 such as a DV camcorder, a DV deck, and/or the like. The DV data source(s) are coupled to I/O peripheral interface 175 over a peripheral interconnect 181. The peripheral interconnect implements one or more protocols to provide DV data source control (e.g., play and pause operation control) and data streaming. Such interfaces include, for example, IEEE 1394 Serial Bus, Universal Serial Bus (USB), Serial Digital Interface (SDI), analog data capture, and/or other peripheral interconnect interfaces that provide isochronous (real-time) data flow and I/O command exchange between the computer 130 and the DV data source(s) 176.

In this implementation, the I/O peripheral interface 175, which is an I/O controller, includes an IEEE 1394 Open Host Control Interface (OHCI) card for copying data streamed by the DV device to data capture buffers in system memory 134. Such data capture buffers (i.e., input buffers) are described in greater detail below in reference to capture buffers 210-1 through 210-N of FIG. 2.

Computer 130 may operate in a networked environment using logical connections to one or more remote computers, such as a remote computer 182. Remote computer 182 may include some or all of the elements and features described herein relative to computer 130. Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface 186. When used in a WAN networking environment, the computer typically includes a modem 178 or other means for establishing communications over WAN. 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180. In a networked environment, program modules depicted relative to computer 130, or portions thereof, may be stored in a remote memory storage device. Thus, e.g., as depicted in FIG. 1, remote application programs 189 may reside on a memory device of remote computer 182. The network connections shown and described are exemplary and other means of establishing a communications link between the computers may be used.

Figure 2:
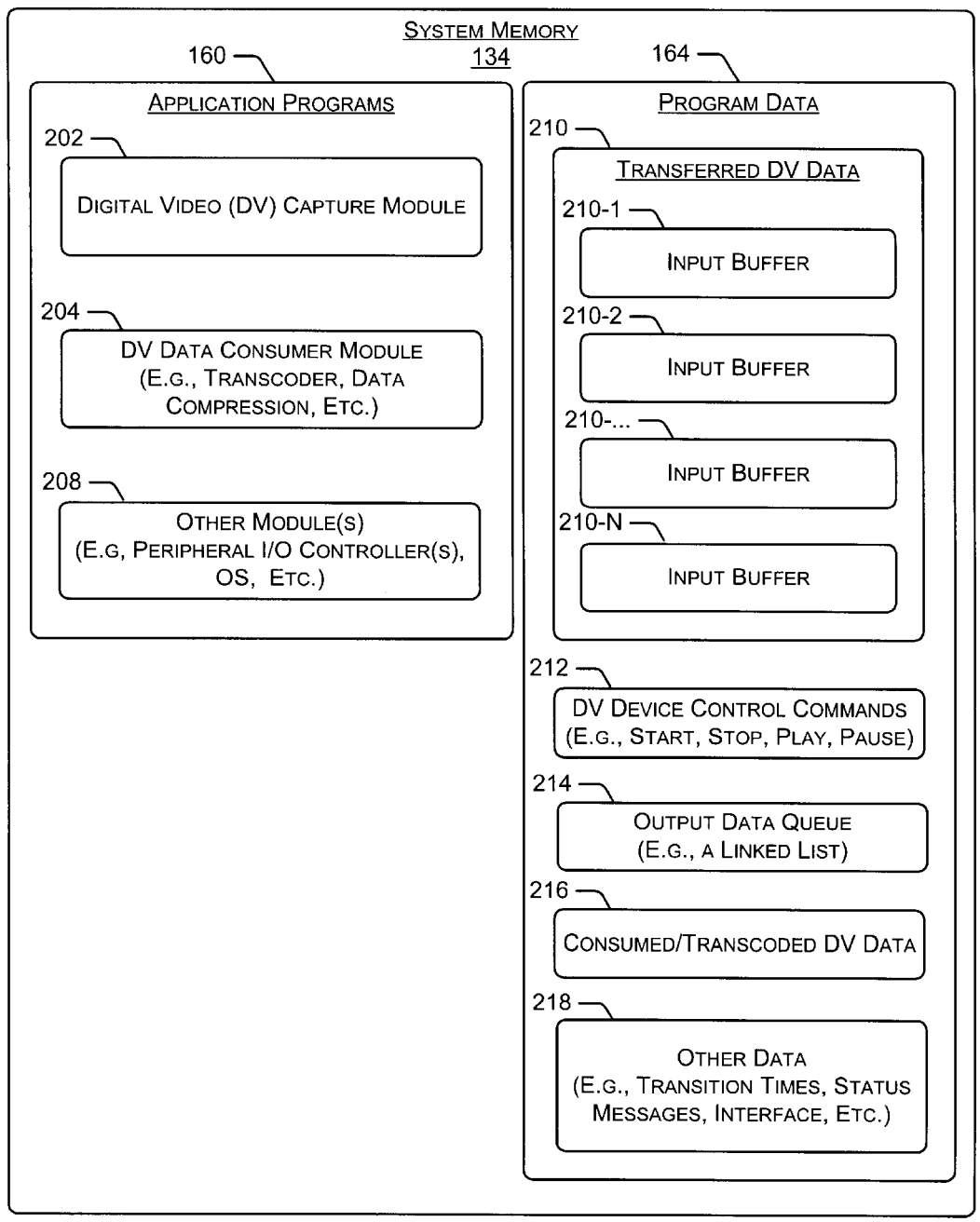
FIG. 2 is a block diagram that shows exemplary aspects of application programs and program data of the exemplary computing device of FIG. 1.

FIG. 2 shows further detail of the exemplary application programs 160 and program data 164 of FIG. 1. For purposes of discussion, features of FIG. 2 are discussed while referencing various components of FIG. 1. Turning to FIG. 2, system memory 134 is depicted as including, for example, digital video (DV) capture module 202, DV consumer module 204, and one or more other modules 208 (e.g., an operating system (OS) to provide a runtime environment, etc.). In one implementation, the DV consumer module is a transcoding application that converts transferred DV data to a different data format such as to an MPEG data format. For purposes of discussion, converted DV data is represented as consumed/transcoded DV data 216.

Digital Video (DV) capture module 202 regulates synchronous data streaming of DV data from a tape operated by DV data source 176 (FIG. 1) to match DV data consumption rates by a DV data consumer module/application 204 that is hosted by the computer 130 (FIG. 1). The communicated DV data is represented in FIG. 2 as transferred DV data 210. A device driver, represented as a peripheral I/O controller of "other data" 208 of FIG. 2, copies the communicated DV data from the peripheral device interconnect 181 (FIG. 1) into one or more input buffers 210-1 through 210-N, as regulated by the DV capture module. In one implementation, the DV capture module is encapsulated by the I/O controller. In this implementation, the I/O controller is compatible with the IEEE 1394 OHCI specification.

DV capture module 202 communicates device commands 212 (e.g., start, stop, play, and pause commands) to the DV data source 176 (FIG. 1). Such commands are exposed by DV data source APIs to allow for remote control of the DV data source. For example, the DV capture module sends a "play" command 212 to the DV data source at certain times as a function of input buffer 210 emptiness and fullness states. Receipt of the play command by the DV device directs the DV data source to enter a "play-mode". In play-mode, the DV data source sequentially streams DV data over the peripheral device interconnect 181 (FIG. 1) to the computer 130 (FIG. 1). DV data streamed by the DV data source while in play-mode is substantially unique DV data. Substantially unique DV data is unique with respect to other DV data as a function of content, time, sequence count, and/or the like.

Additionally, the DV capture module 202 sends a "pause" command 212 to the DV data source at certain times. The certain times are also a function of input buffer 210 emptiness and fullness states. Receipt of the pause command by the DV data source directs the DV data source to enter a "play-pause mode". In play-pause mode, the DV data source streams non-substantially unique DV data to the computer 130 (FIG. 1). As noted above, such non-substantially unique DV data represents repeat DV data frames, each of which represent a particular unique data frame which has already been received by the computer 130. In this example, repeat data frames are not unique with respect to other DV data frames as a function of content, time, sequence count, and/or the like.

As DV data source 176 (FIG. 1) transfers DV data in real-time, DV capture module 202 fills respective ones of the input buffer(s) 210 with the transferred DV data. The DV capture module pushes a filled input buffer to output data queue 214 (e.g., a linked list) for subsequent access/processing by DV data consumer module 204. Thus, as DV data is received, the output data queue fills with one or more input buffers 210. The DV data consumer module removes or "pops" a filled input buffer 210 from the output data queue to access and operate on the transferred DV data in the input buffer, for example, to perform data compression operations in the transferred DV data. If such DV data capture operations were to remain unchecked, the output data queue would soon fill with "N" input buffers, wherein N is the total number of available input buffers, causing overflow and lost data. This is because the transferred DV data is being received in real-time and when at the same time (in parallel) DV data consumer module operations are processor-bounded.

To avoid such an output data queue 214 data overflow condition, DV capture module 202 calculates respective amounts of time that it takes the DV data source 176 (FIG. 1) to implement a plurality of operations responsive to receiving respective device commands 212. These calculated times correspond to device transitions from stop and pause modes to a respective start and play modes. Such DV data source transitions times are represented in the "other data" 218 portion of FIG. 2. The actual amount of time that it takes the DV device to transition from a first mode to a second mode typically varies as a function of how quickly the particular DV data source architecture implements a particular DV command.

For example, in one DV device architecture, the amount of time that the DV data source 176 (FIG. 1) takes to transition from play-mode to stop-mode responsive to receipt of a stop command 212, may take from one (1) to three (3) seconds or more. Whereas, the amount of time that the DV data source takes to transition from play-mode to play-pause-mode is generally much quicker, but is not necessarily the same amount of time that the device will take to transition from play-pause mode to play-mode.

To calculate the actual transition times, the DV capture module 202 sends respective control commands 212 to the DV data source 176 (FIG. 1). The amounts of time that elapse before receiving respective command responses from the DV data source are recorded. Such command responses include, for example, success/failure status messages, repeat DV data frames, and/or the like. For example, at time t0 the DV capture module 202 sends a play-pause command 212 to the DV data source 176 (FIG. 1), which is already in play mode. Responsive to receipt of the play-pause command and upon successful transition to the play-pause state, the DV data source can send a success status message, or alternatively, a failure status message. The status message is received and parsed by the DV capture module and represented as a portion of "other data" 218 of FIG. 2. Upon receipt of a successful status message at time t1, play to play-pause transition mode time is calculated as t1–t0. In this manner, the DV capture module determines DV data source mode-to-mode transitions times.

In another implementation, DV data source 176 (FIG. 1) mode-to-mode transition are determined by monitoring frame time codes and the like, of each incoming frame of DV data 210. This works since the DV data source repeatedly communicates the same frame in play-pause mode. For example, at time t0 the DV capture module sends a play-pause command 212 (FIG. 2) to the DV data source, which in this example is already in play mode. Responsive to receipt at time t1 of a same video frame as a previous video frame with a different time code, play to play-pause transition mode time is calculated as t1–t0.

In one implementation, the DV capture module 202 presents a user interface (UI) on to display device 172 (FIG. 1) to inquire as to whether a user would like to calibrate command transition times for the particular DV data source. Such a user interface is represented as a portion of "other data" 218 (FIG. 2). In one implementation, for example, the DV capture module 202 automatically calibrates the transition times used by any one particular device responsive to being connected to the particular device. This is accomplished by sending respective DV data source control commands 212 to the DV data source 176 (FIG. 1) and recording is respective amounts of time that elapsed before receiving respective command responses (e.g., success/failure status messages, repeat DV data frames, and/or the like) from the DV data source.

The DV capture module 202 uses calculated DV data source state/mode transition times to regulate or "throttle" the particular portions of DV data that are sent by the DV data source in real-time to computer 130 (FIG. 1) to match processor-bounded data consumption rates of DV data consumer 204. Such throttling is achieved by timing communication of respective ones of the device commands to the DV data source. The timing is a function of the corresponding transitions times and the number of input buffers 210 that remain in output data queue. By throttling the content of the DV data that is captured at real-time rates (i.e., unique DV data frames verses repeat DV data frames) with processor-bounded DV data consuming operations, the DV capture module effectively prevents any number of input buffers 210 from reaching conditions that result in overflow or underflow conditions with respect to substantially unique DV data. This throttling is now illustrated via the exemplary graph of FIG. 3.

Figure 3:
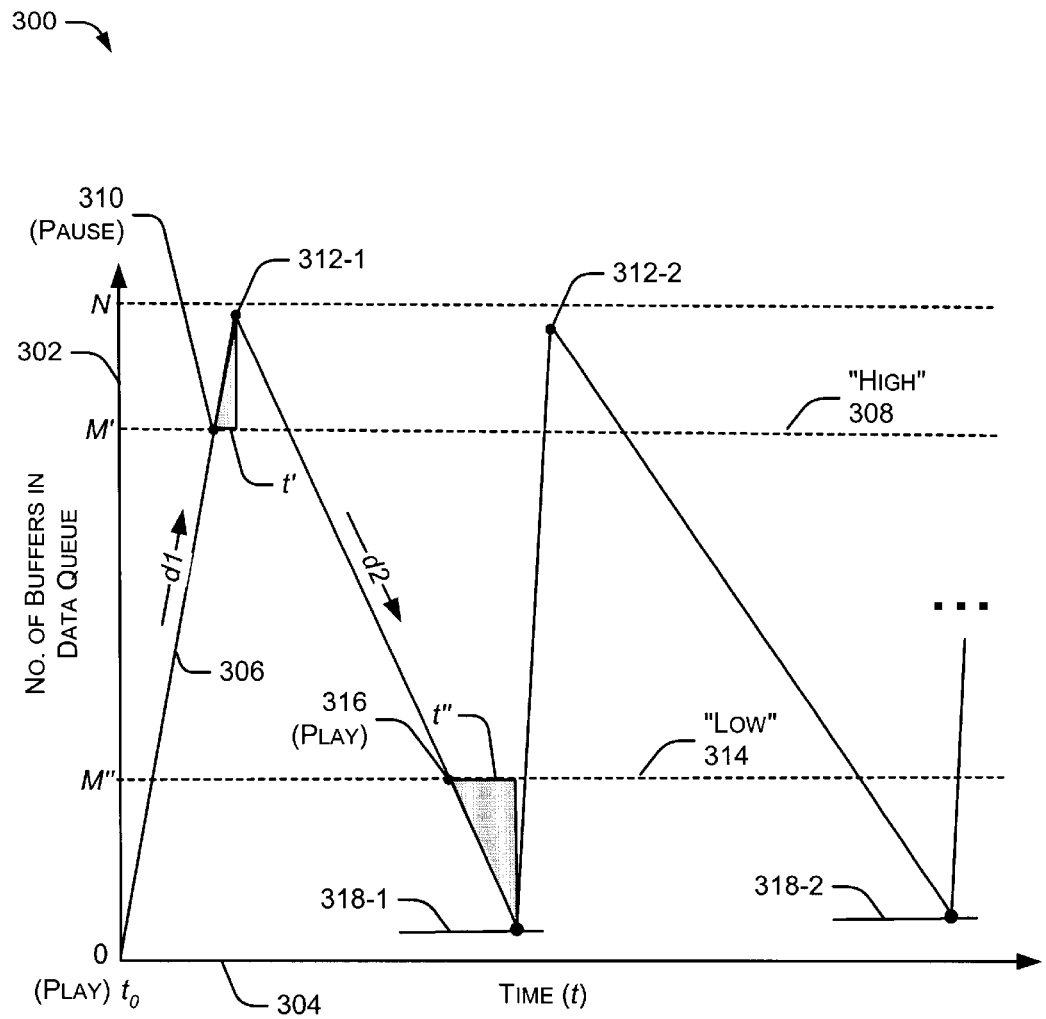
FIG. 3 is a graph showing exemplary regulation of real-time digital video (DV) data capture rates as a function of the speed at which captured DV data is consumed by a processor-bounded application and as a function of DV device play and pause mode transition rates.

In particular, FIG. 3 shows an exemplary graph 300 to illustrate regulation of real-time DV data capture rates as a function of: the speed at which captured DV data is consumed by a processor-bounded application, and as a function of the amount of time that it takes the DV capture module to determine that the DV data source has transitioned from first modes to second modes. For purposes of discussion, the graph is described while referring to various components of FIGS. 1 and 2.

Vertical axis 302 of FIG. 3 represents the number of input buffers 210-1 through 210-N (FIG. 2) that have been pushed into the output data queue 214 (FIG. 2). Note that the number of available input buffers in the data queue ranges from between zero (0) and "N". Input buffers in the output data queue have already been filled with transferred DV data by DV capture module 202. Each input buffer is of finite size, having a respective byte-size that is a function of any number of criteria such as DV data frame size, the amount of volatile and/or non-volatile data storage, expected DV data transfer speeds, and/or the like. For example, a standard definition DV data frame in NTSC data format has a frame size of 120,000 bytes, whereas a DV data frame in PAL data format consists of a frame size of 144,000 bytes.

The number of input buffers 210, N, is selected is a function of at least the following: input buffer size, amount of time that a single buffer can be filled with real-time DV data transfers, and calculated DV data source 176 (FIG. 1) mode transition times (see, transition times in "other data" 218 of FIG. 2). Other criteria may also be used to select N, such as the amount of available memory, and so on.

Horizontal axis 304 represents the passage of time t. Line 306 tracks the both number of input buffers 210 (FIG. 2) pushed and removed from data queue 218 (FIG. 2) as time t increases from left to right. For example, DV capture module 202 (FIG. 2) pushes input buffers 210-1 through 210-N (FIG. 2) into the output data queue. DV data consumer module 204 (FIG. 2) removes pushed input buffers from the output data queue for subsequent data processing/conversion operations.

As illustrated by the vertical axis 302, there are N possible input buffers 212 (FIG. 2) that can be added to the output data queue 214 (FIG. 2). Anticipation of queue fullness is based on the amount of time t that it takes for the DV data source to transition from play to play-pause mode, the remaining number of available input buffers (m), and the rate (r) that input buffers can be filled with captured DV data. Transition time t' of this exemplary graph 300 is the maximum elapsed time that the DV data source 176 (FIG. 1) takes to transition from play to play-pause mode. Since m buffers can be filled at a real-time rate r in time t', when a number approaching or equal to N−m input buffers is detected output data queue buffer fullness is anticipated. In this example, the number of input buffers representing N−m input buffers is illustrated in this example with high mark 308.

Although high mark 308 is described as representing N−m remaining input buffers, this number will typically be set to equal a number of buffers less than N−m. This is illustrated in FIG. 3, wherein DV data source state transition point 312-1 corresponds to a number of input buffers in the output data queue that is less than N. For example, setting the high mark according to N−(m+(1 . . . k)) provides an available buffer cushion against any possible DV data source transition time deviation. The variable "k" is optional, and when used, is selected as a potential safeguard against any jitter that may be caused by a preemptive operating system. Such deviation, for example, may occur as a result of different DV data source implementations, multi-processing operating environment processing priorities, and so on.

When output data queue buffer fullness is anticipated (e.g., point 310), the DV capture module directs the DV data source to not send any "new" DV data frames by communicating a pause control command 212 (FIG. 2) to the DV data source, effectively causing the DV data source to enter play-pause mode. Recall that the DV data source sends only repeat DV data frames in play-pause mode, not new or subsequent sequential DV data frames. The DV capture module 202 (FIG. 2) discards repeat frames by not saving them to respective input buffer(s) 210.

As illustrated by the vertical axis 302, when there are zero (0) input buffers 212 (FIG. 2) in output data queue214 (FIG. 2), the output data queue is empty. An application 204 (FIG. 2) that is pulling information from the output data queue for processing operations may experience a buffer underflow condition if the output data queue is ever allowed to reach such an empty state. DV capture module 202 (FIG. 2) avoids output data queue underflow conditions by keeping at least a single input buffer in the output data queue for subsequent consumption by such a data consuming application. This is accomplished by anticipating emptiness of the output data queue.

Anticipation of output data queue emptiness takes into the amount of time t that it takes for DV data source 176 (FIG. 2) to transition from play-pause to play mode, the remaining number of available input buffers (N−some number of buffers), and the rate (r') at which such buffers can be removed from the output data queue by DV data consuming module 203 (FIG. 2). The determination of whether the DV data source has transitioned from play-pause mode to play-mode can be made upon receipt of a success status message (e.g., see other data 218) or upon detection of a repeat DV data frame.

In the example of FIG. 3, transition time t" is the maximum amount of time that the DV data source 176 (FIG. 1) takes to transition from "play-pause" mode to play-mode. Time t" will generally vary as a function of respective DV data source architectures. Given a rate r' of data consumption, 1 input buffers can be consumed in time t". Accordingly, when the number of buffers in the output data queue equals l+0 . . . j output data buffer emptiness is anticipated. l+0 . . . j is represented as low mark 314. When output data queue buffer emptiness is anticipated (e.g., point 316), the DV data source's data transport state is switched from play-pause to play mode. This technique allows the capture module to receive and push new DV data into the output data queue prior to any occurrence of an underflow condition.

In one implementation, the number of additional buffers used by the DV capture module 202 (FIG. 2) during transition from play to play-pause modes is calculated as follows. Time t0 is set to equal the current time. At time t0, a play control command 212 (FIG. 1) is sent to the DV data source 176 (FIG. 1). At some point, such as after a threshold amount of time, or responsive to receipt of a status message from the DV data source, the DV data source is optionally queried to ensure that it is indeed in play mode. Once it has been determined that the DV device has transitioned into play mode, t0 is set to equal the current time. Time t0 is then subtracted from time t1. This represents the amount of time (elapsed time) that it takes the DV data source to transition from play to play-pause state.

Referring to the vertical axis 302 of FIG. 3, N−M'represents the number of buffers 210 (FIG. 2) used by the DV capture module 202 (FIG. 2) to compensate for the time the DV data source 176 (FIG. 1) uses to transition from play to play-pause mode. This number of buffers is equal to (elapsed time/frame time)+1. The variable "frame time" is 1001/30 milliseconds (msec) for NTSC or 40 msec for PAL, and "1" (or 1 . . . k) is additional buffering used to offset any jitter that may occur as a result of a pre-emptive multitasking operating system.

A technique such as that described in the immediately two preceding paragraphs can be used to calculate the number of buffers 210 (FIG. 2) used to compensate for the time used by a DV data source 176 (FIG. 1) to transition from play-pause to play mode. In such a case, play mode is replaced with play-pause, and the number of buffers is represented by M", as illustrated on the vertical axis of FIG. 3.

Exemplary operations of DV capture module 202 are now described with respect to the feature of graph 300. At time zero (0), the DV capture module sends DV data source 176 (FIG. 1) play command 212. Responsive to receipt of the play command, the DV data source begins streaming DV data to computer 130 (FIG. 1). As time increases to the right, and as indicated by following line 306 in direction d1, more input buffers are added to the data queue 218. This continues until the number of input buffers is equal to a maximum predetermined number of input buffers that can be added to the queue before the DV data source is directed to stop send new data. This maximum predetermined number is represented by high mark 308, which intersects the vertical axis of the graph as well as various portions of line 306.

At point 310, wherein line 306 intersects "high" mark 308, DV capture module 202 (FIG. 2) sends a pause command 212 to DV data source 176 (FIG. 1). Note that as time t increases from point 310 to apex 312-1, which represents the moment that the DV data source has implemented the pause command, the number of input buffers 210 added to data queue 218 (FIG. 2) increases. However, as mentioned above, the number of buffers in the output data queue is not allowed to exceed N buffers to avoid data overflow conditions.

Moving in direction d2, line 306 illustrates the removal of input buffers 210 (FIG. 2) by DV consumer module 204 (FIG. 2) from the data queue 218. At this point, DV data source 176 (FIG. 1) is sending repeat (nonsequential) data packets that are discarded upon receipt by DV capture module 202 (FIG. 2). Thus new DV data is not being added to the output data queue. Buffer consumption by the consumer module is allowed to continue until the "low" mark 314 is reached. As discussed above, the low mark represents the minimum predetermined number of input buffers that can be in the data queue before the DV capture module requests the DV data source to being sending new (sequential) DV data for insertion into the output data buffer.

Referring to point 316-1, wherein line 306 has intersected with "low" mark 314, DV capture module 202 (FIG. 2) sends a play command 212 to DV data source 176 (FIG. 1). Note that as time t increases from point 316 to point 318-1, which represents the moment that the DV capture module determines that the DV data source has implemented the play command, the number of input buffers 210 remaining in the data queue 218 (FIG. 2) decreases. However, the number of buffers in the data queue is not allowed to equal zero (0) buffers to negate any data underflow conditions that would otherwise be experienced by DV consumer module 204 (FIG. 2).

Note in this exemplary graph 300, ascending portions of line 306 (e.g., those portions that trend in direction d1) are steeper than descending portions (e.g., those portions of the line that trend in direction d2). This asymmetry illustrates that real-time data capture rates are typically faster than processor-bounded data consuming operations. For example, in one implementation, d1has slope of 29.97 frames per second when DV data frames are received in NTSC format, and 25 frames per second when the DV data frames are in PAL data format. The slope of line 306 in direction d2" is processor speed dependent. This asymmetry is not intended to reflect actual data capture/consumption rates other than indicating that one is performed in real-time, while the other is processor-bounded.

Along this same line, in the example of FIG. 3, if the data consumption rate is relatively equal to the data capture rate, the highest and lowest points 312-1 and 318-1 will be positioned somewhere between lines 308 and 314. This illustrates that where data consumption and data capture rates substantially equal, the throttling algorithm to prevent underflow and/or overflow conditions is not needed. In one implementation, the throttling algorithm is only applied when the data capture rates are greater than the data consumption rates.

An Exemplary Procedure

Figure 4:
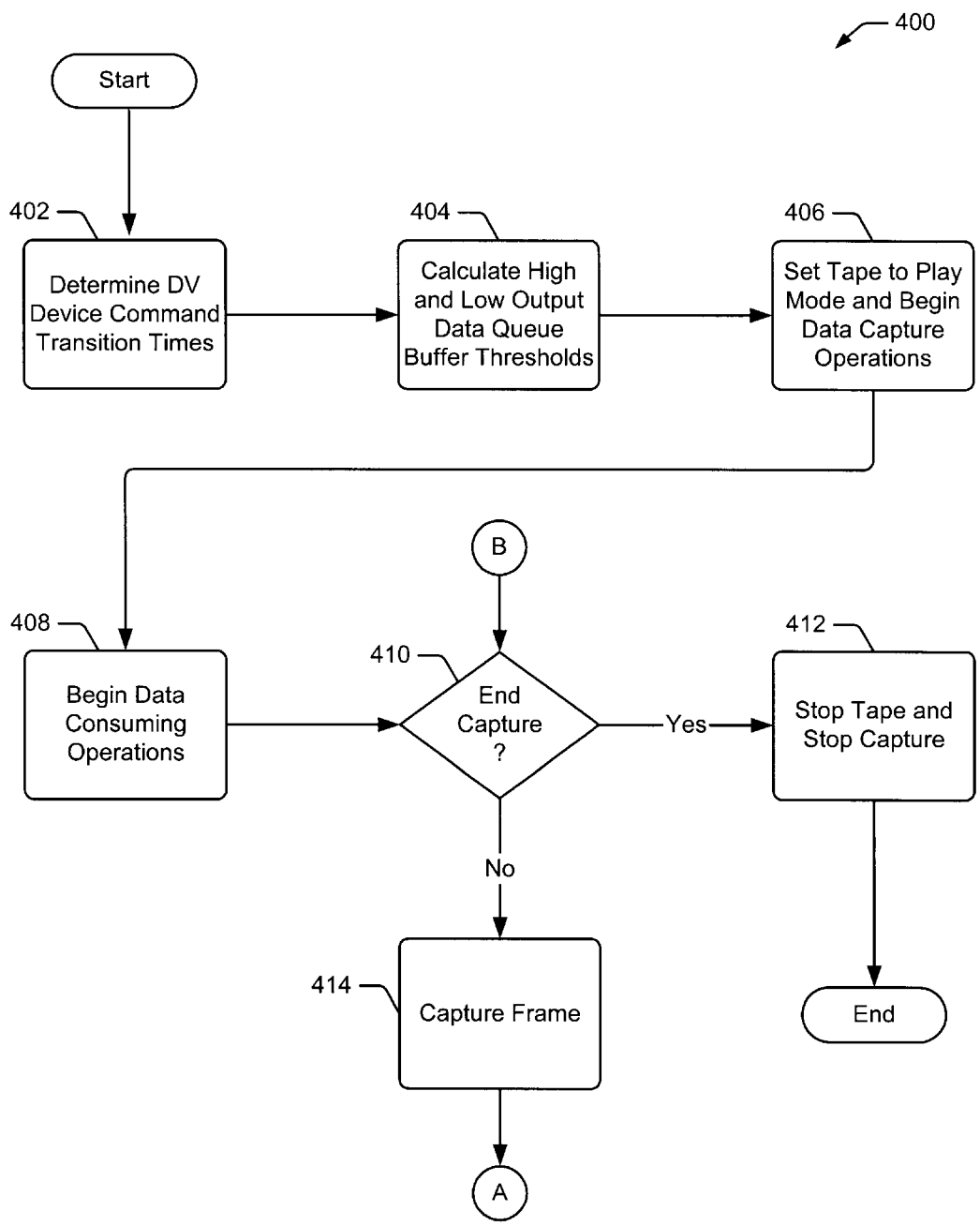
FIG. 4 is a flow diagram showing an exemplary procedure to regulate real-time data capture rates to match processor-bound data consumption rates.

FIG. 4 is a flow diagram showing an exemplary procedure 400 to regulate real-time data capture rates to match processor-bound data consumption rates. For purposes of discussion, operations of the procedure are discussed while referencing various components from FIGS. 1 and 2. At block 402 of FIG. 4, DV capture module 202 (FIG. 2) determines DV data source command transition times. Such command transition times correspond to the amount of time that DV data source 176 (FIG. 1) takes to implement a command 212 (FIG. 2), such as a start, stop, play, and pause control command, subsequent to receipt of the command from computer 130 (FIG. 1).

At block 404, DV capture module 202 calculates high and low output data queue buffer thresholds. The high output data queue buffer threshold is based on the amount of time required for DV data source 176 (FIG. 1) to transition from a play mode to a play-pause mode. As described above in reference to FIG. 3, this high threshold triggers communication of a play-pause device control command 212 (FIG. 2) to the DV data source in anticipation of output data queue fullness as data input buffers 210 (FIG. 2) are pushed by the DV capture module into output data queue 214 (FIG. 2). The low threshold is based on the amount of time required for the DV data source to transition from a play-pause mode to a play mode. Responsive to reaching this low threshold, the DV capture module communicates a play device control command 212 to the DV data source in anticipation of output data queue emptiness as data input buffers are pulled or removed from the output data queue by DV consumer module 204 (FIG. 2).

At block 406, DV capture module 202 (FIG. 2) communicates a play command 212 (FIG. 2) to DV data source 176 (FIG. 1) to cause the DV data source to begin streaming media to computer 130 (FIG. 1). At block 406, responsive to receiving stream media from the DV data source, the DV capture module begins data capture operations, storing received DV data into one or more input buffers 210 (FIG. 2) and pushing respective full ones of the input buffers into output data queue 214 for subsequent processing by DV consumer module 204 (FIG. 2). At block 408, DV data consuming operations of the DV data consumer module 204 (FIG. 2) are started in parallel with DV data capture operations of the DV capture module. In one implementation, these data consuming operations are data compression operations to reduce the data size of received DV data for storage as transcoded DV data 216 (FIG. 2).

At block 410, DV capture module 202 (FIG. 2) determines whether or not DV data capture from the DV data source 176 (FIG. 1) should end. Such a determination can be achieved in numerous ways. For example, the user of the DV data source may shut such streaming operations off by manual or remote selection of a DV data source command. In another example, DV data source streaming operations may be turned off by a user of computer 130 (FIG. 1) via interaction with a DV data capture UI (e.g., "other data" 218 of FIG. 2). In yet another example, DV data capture operations may end automatically as result of receiving and end of tape signal from the DV data source. In either case at block 412, it having been determined that data capture operations should end, DV capture module stops capture operations and, if necessary, sends a stop device command 212 (FIG. 2) to the DV data source.

Otherwise, at block 414, DV capture module continues capture operations by capturing the next frame of received DV data. As already noted, this capture frame is stored into a respective input buffer 210 (FIG. 2) for subsequent insertion into output data queue 214 (FIG. 2). Procedure 400 continues at block 502 of FIG. 5 as illustrated by on page reference "A".

Figure 5:
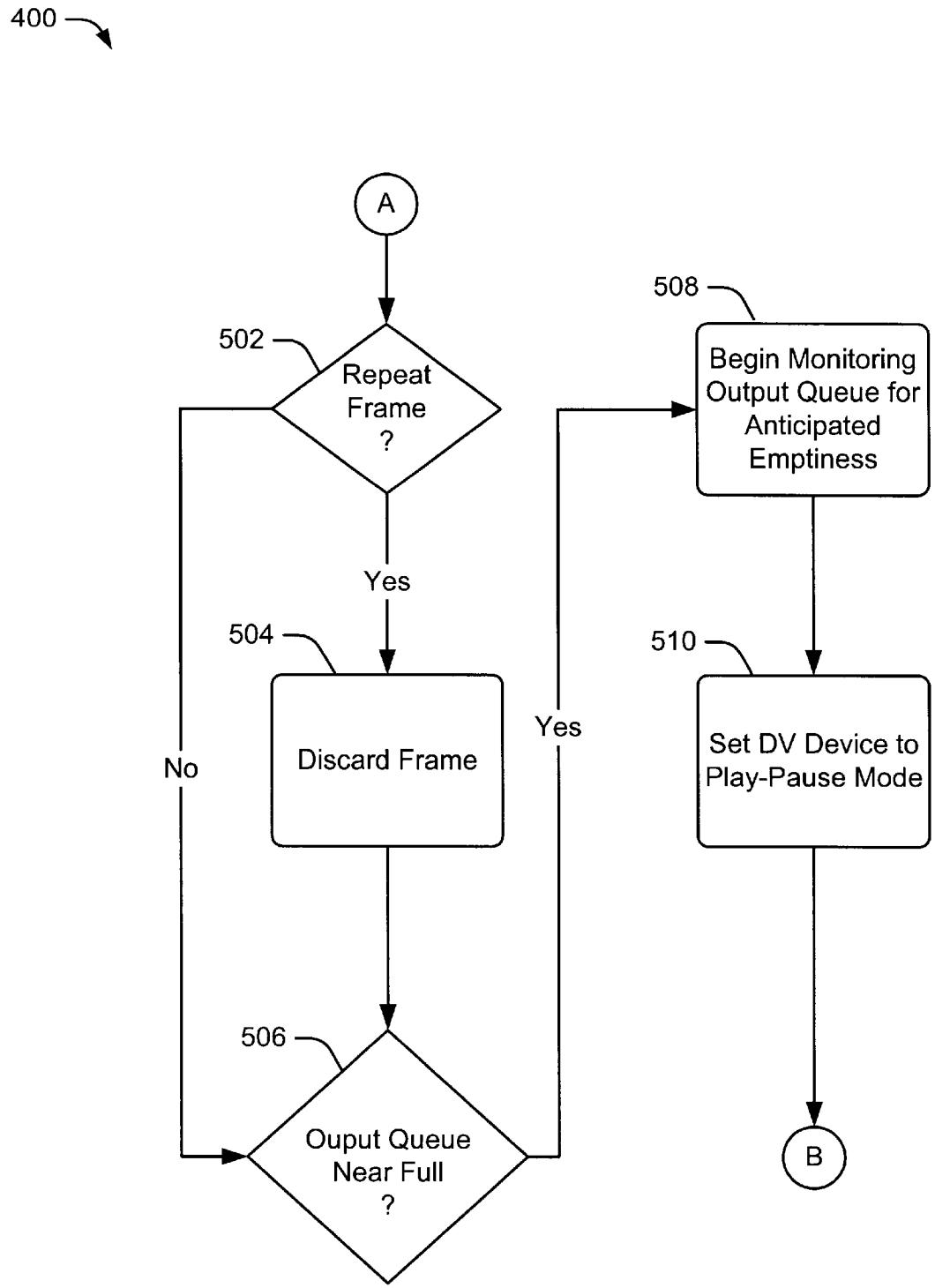
FIG. 5 shows further aspects of the exemplary procedure of FIG. 4. In particular, the operations of FIG. 5 manage the number of capture buffers in an output data queue so that no overflow conditions occur in data transfer buffers.

FIG. 5 shows further aspects of the exemplary procedure 400 of FIG. 4. In particular, the operations of FIG. 5 manage the number of input buffers 210 (FIG. 2) present in output data queue 214 (FIG. 2) so that no overflow conditions occur during input buffer removal by a processor-bounded consumer operation. For purposes of discussion, the operations of FIG. 5 are described while referring to various components of FIGS. 1 and 2.

At block 502, DV capture module 202 (FIG. 2) determines whether the captured frame is a repeat DV data frame. In general, whenever the DV data source has transitioned to the play-pause mode, only repeat frames. are received by the DV capture module. At block 504, a repeat DV data frame having been received, the repeat DV data frame is discarded and not pushed to output data queue 214 (FIG. 2).

The procedure 400 continues at block 506 regardless of whether or not a repeat data frame was received at block 502. At block 506, the DV capture module determines whether output data queue 214 (FIG. 2) is nearly full. This is accomplished by determining if the number of full input buffers 210 (FIG. 2) in the output data queue is substantially equal to the number of input buffers identified by the high data queue buffer threshold (determined at block 404 of FIG. 4 and represented as the high mark 308 of FIG. 3). If so, at block 508, the DV capture module begins monitoring the output data queue for anticipated emptiness. This operation is described in greater detail below in reference to FIG. 6, wherein it is determined whether the number of full input buffers 210 (FIG. 2) in the output data queue is substantially equal to the number of input buffers identified by the low data queue buffer threshold (determined at block 404 of FIG. 4 and represented as the low mark 314 of FIG. 3). Next, at block 510, the DV capture module 202 (FIG. 2) directs the DV data source to transition to play-pause mode. At this point, the procedure continues at block 410 of FIG. 4 as indicated by on page reference "B".

Figure 6:
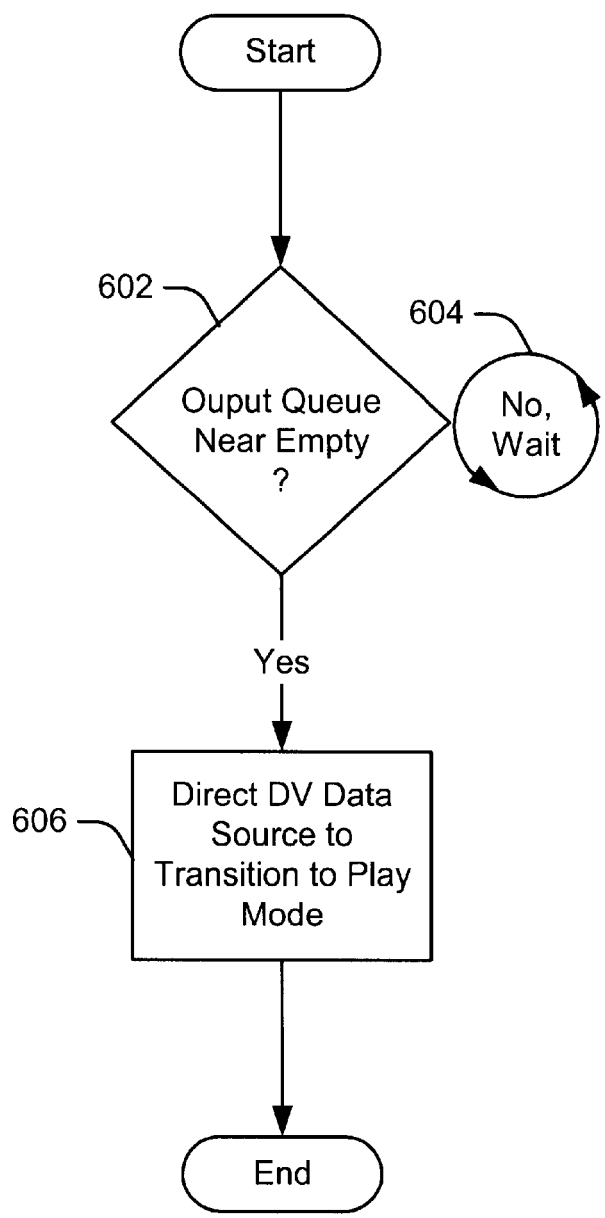
FIG. 6 shows further aspects of the exemplary procedure of FIGS. 4 and 5. In particular, the operations of FIG. 6 manage data flow into a number of capture buffers so that no data underflow conditions occur in the capture buffers.

FIG. 6 shows further exemplary aspects of the procedure 400 of FIGS. 4 and 5. In particular, FIG. 6 represents a thread of execution that monitors the output data queue 214 of FIG. 2 for anticipated emptiness. At block 602, this is accomplished by determining whether the number of input buffers and the output data queue is substantially equal to the number of input buffers identified by the low data queue buffer threshold (calculated above during the operation of block 404 of FIG. 4 and represented by the low mark 314 of FIG. 3). At block 604, when the output data queue has been determined not to be near empty of input buffers, the procedure waits and continues to monitor the output data queue for anticipated emptiness.

At block 606, the output data queue being anticipated to be near empty in view of the amount of time that it takes the DV data source 176 (FIG. 1) to transition to the play-mode, the DV capture module directs the DV data source to transition to play-mode. This is accomplished by communicating a play device command 212 (FIG. 2) to the DV data source. Receipt of the play device command by the DV data source causes the DV data source to resume streaming new DV data frames, as compared to repeat DV data frames sent while the device is in play-pause mode, to the DV capture module. This operation avoids data underflow conditions at the output data buffer as a function of DV data source pause-play to play mode transition time. At this point, the procedure continues at block 410 of FIG. 4 as described above and as represented by on-page reference Alternate Implementations The described systems and methods to regulate real-time data capture rates to match processor-bound data consumption rates are extensible. For example, in an alternative implementation the DV data source 212 (FIG. 2) is directed to transition from one mode-to-another mode when processing and/or memory resources of the computing device 130 (FIG. 1) are stressed. This alternate implementation is illustrated by the exemplary graph 300 of FIG.3, wherein the points 312-1 and 318-1 respectively represent upper and lower thresholds or limits of allowable computing resource utilization or stress.

Conclusion

The described systems and methods regulate real-time data capture rates to match processor-bounded data consumption rates. This provides substantially optimized use of DV data input buffers 210 (FIG. 2) and processing resources 132 (FIG. 2) managed by a target data transfer devices 130 (FIG. 1). Since the described systems and methods implement a push model of real-time DV data transfer with throttling capability on the target device, the invention allows for substantially flexible and extensible DV data consumer module 204 (FIG. 2) implementations. For instance, the described systems, apparatus, and methods can be applied to any tape device that has an interface/bus that provide interconnect to a host (PC) to stream data in real time and to perform device control, like transport state (play, pause, stop).

Accordingly, although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

What is claimed is:

1. In a computer system coupled to a data source, a method comprising:
   determining a first transition time for the data source to transition from a first mode to a second mode;
   determining a second transition time for the data source to change from the second mode to the first mode; and
   based on the first end second transition times, directing the data source to transition into respective ones of the first and second modes such that real-time capture of data from the data source is regulated by the computer system to match processor-bound data consumption rates of an application consuming the data.

2. A method as recited in claim 1 wherein the computer system is coupled to the data source over a peripheral interconnect interface that provide isochronous data flow and input/output (I/O) command exchange between the computer system and the data source.

3. A method as recited in claim 1:
   wherein the computer system is coupled to the data source over an IEEE 1394 based peripheral interconnect; and
   wherein operations of determining and directing are performed by sending device commands to the data source over the peripheral interconnect.

4. A method as recited in claim 1, wherein the data source is a digital video (DV) device, and wherein the data is DV data.

5. A method as recited in claim 1, wherein the application consuming the data is any processor-bounded application.

6. A method as recited in claim 1, wherein the respective transition times correspond to: (a) time it takes for the data source to transition from a play mode to a pause-play mode, and (b) time it takes for the data source to transition from the pause-play mode to the play mode.

7. A method as recited in claim 1, wherein directing further comprises:
   calculating a high threshold to indicate that an output data queue will become full with captured data within the first transition time;
   detecting that a number of buffers in the output data queue is equal to a number indicated by the high threshold; and
   responsive to detecting, transitioning the data source from the first mode to the second mode such that the data source sends repeat data frames to the computer system.

8. A method as recited in claim 1, wherein directing further comprises;
   calculating a low threshold to indicate that the output data queue will become empty of captured data within the second transition time;

detecting that a number of buffers in the output data queue is equal to a number indicated by the low threshold; and responsive to detecting, transitioning the data source from the second mode to the first mode such that the data source sends sequential and substantially unique data frames to the computer system.

9. A method as recited in claim 1, wherein directing further comprises:

calculating a high threshold to indicate that one or more computing resources are becoming stressed;

detecting that utilization of the one or more computing resources has reached the high threshold; and responsive to detecting, transitioning the data source from the first mode to the second mode such that the data source sends repeat data frames to the computer system.

10. A method as recited in claim 1, wherein directing further comprises:

calculating a low threshold to indicate that computing resource utilization will become underutilized within the second transition time;

detecting that the low threshold has been reached with respect to the computing resource utilization; and responsive to detecting, transitioning the data source from the second mode to the first mode such that the data source sends non-repeat data to the computer system.

11. A computer-readable medium comprising computer-program instruction executable by a processor for:

determining a first transition time for a data source to change from a first mode to a second mode;

determining a second transition time for the data source to change from the second mode to the first mode; and directing, based on the first and second transition times, the data source into respective ones of the first and second modes such that real-time capture of data from the data source is regulated to match processor-bound data consumption rates of an application consuming the data, the application consuming the data being independent of capturing the data.

12. A computer computer-readable medium as recited in claim 11, wherein the instructions for directing further comprises:

calculating a high threshold to indicate that one or more computing resources are becoming stressed;

detecting that utilization of the one or more computing resources has reached the high threshold; and responsive to detecting, transitioning the data source from the first mode to the second mode such that the data source sends repeat data frames to the computer system.

13. A computer-readable medium as recited in claim 11, wherein directing further comprises:

calculating a low threshold to indicate that computing resource utilization will become underutilized within the second transition time;

detecting that the low threshold has been reached with respect to the computing resource utilization; and responsive to detecting, transitioning the data source from the second mode to the first mode such that the data source sends non-repeat data to the computer system.

14. A computer-readable medium comprising computer-program instructions executable by a processor for:

determining a transition time for a source device to change from real-time communication of sequential portions of media to real-time communication of repeat portions of the media;

storing received sequential portions of the media into one or more buffers of a maximum number of buffers;

calculating, based on (a) the transition time, (b) a count of the one or more buffers, and (c) a rate at which a processor-bound application is consuming the received sequential portions from the one or more buffers, that data capture rates must be reduced to avoid data overflow conditions; and responsive to calculating that data capture rates must be reduced, transitioning the source device to send repeat portions of the media, the repeat portions not being cached to the buffers.

15. A computer-readable medium as recited in claim 14, wherein the source device is a digital video (DV) device and wherein the media is DV data.

16. A computer-readable medium as recited in claim 14:

wherein the instructions for determining, storing, calculating and transitioning are performed by a computing device coupled to the source device over an IEEE 1394 based peripheral interconnect bus; and wherein the instructions for determining, storing, calculating and transitioning are performed by sending device control commands to the source device over the peripheral interconnect bus.

17. A computer-readable medium as recited in claim 14, wherein the transition time is a first transition time, and wherein the computer-program instructions further comprise instructions for:

identifying a second transition time corresponding to time it takes for the source device to change from real-time communication of repeat portions of the media to real-time communication of sequential portions of media;

evaluating (a) the second transition time, (b) a count of the one or more buffers remaining in an output queue, and (c) a rate at which a processor-bound application is consuming the received sequential portions of the media from the output queue, to decide that data capture rates must be increased to avoid data underflow conditions; and responsive to evaluating that data capture rates must be increased, directing the source device to send sequential portions of the media for caching into buffer(s) of the one or more buffers.

18. A computer-readable medium as recited in claim 17:

wherein the instructions for determining, storing, calculating, transitioning, identifying, evaluating, and directing are performed by a computing device coupled to the source device over an IEEE 1394 based peripheral interconnect bus; and wherein the instructions for determining, storing, calculating, transitioning, identifying, evaluating, and directing are performed by sending device control commands to the source device over the peripheral interconnect bus.

19. A computing device comprising:

a processor; and a memory coupled to the processor, the memory comprising computer-program instructions executable by the processor for:

determining a transition time for a source device to change from real-time communication of sequential portions of media to real-time communication of repeat portions of the media;

storing received sequential portions of the media into one or more buffers of a maximum number of buffers;

calculating, based on (a) the transition time, (b) a count of the one or more buffers, and (c) a rate at which a processor-bound application is consuming the received sequential portions from the one or more buffers, that data capture rates must be reduced to avoid data overflow conditions; and responsive to calculating that data capture rates must be reduced, transitioning the source device to send repeat portions of the media, the repeat portions not being cached to the one or more buffers.

20. A computing device as recited in claim 19, wherein the source device is a digital video (DV) device and wherein the media is DV data.

21. A computing device as recited in claim 19:

wherein the instructions for determining, storing, calculating and transitioning are performed by a computing device coupled to the source device over an IEEE 1394 based peripheral interconnect bus; and wherein the instructions for determining, storing, calculating and transitioning are performed by sending device control commands to the source device over the peripheral interconnect bus.

22. A computing device as recited in claim 19, wherein the processor-bound application is a data compression application.

23. A computing device as recited in claim 19, wherein the transition time is a first transition time, and wherein the computer-program instructions further comprise instructions for:

identifying a second transition time corresponding to time it takes for the source device to change from real-time communication of repeat portions of the media to real-time communication of sequential portions of media;

evaluating (a) the second transition time, (b) a count of the one or more buffers remaining in an output queue, and (c) a rate at which a processor-bound application is consuming the received sequential portions of the media from the output queue, to decide that data capture rates must be increased to avoid data underflow conditions; and responsive to evaluating that data capture rates must be increased, directing the source device to send sequential portions of the media for caching into buffer(s) of the one or more buffers.

24. A computing device as recited in claim 23:

wherein the instructions for determining, storing, calculating, transitioning, identifying, evaluating, and directing are performed by a computing device coupled to the source device over an IEEE 1394 based peripheral interconnect bus; and wherein the instructions for determining, storing, calculating, transitioning, identifying, evaluating, and directing are performed by sending device control commands to the source device over the peripheral interconnect bus.

25. A computer system coupled to a data source, the computer system:

means for determining a first transition time for the data source to change from a first mode to a second mode;

means for determining a second transition time for the data source to change from the second mode to the first mode; and means for directing, based on the first and second transition times, the data source into respective ones of the first and second modes such that real-time capture of data from the data source is regulated by the computer system to match processor-bound data consumption rates of an application consuming the data.

26. A computer system as recited in claim 25, wherein the data source is a digital video (DV) device, and wherein the data is DV data.

27. A computer system as recited in claim 25, wherein the application consuming the data is a data compression application.

28. A computer system as recited in claim 25, wherein the respective transition times correspond to: (a) time it takes for the data source to transition from a play mode to a pause-play mode, and (b) time it takes for the data source to transition from the pause-play mode to the play mode.

29. A computer system as recited in claim 25, wherein the means for directing further comprise:

means for calculating a high threshold to indicate that an output data queue will become full with captured data within the first transition time;

means for detecting that a number of buffers in the output data queue is equal to a number indicated by the high threshold; and responsive to detecting, moans for transitioning the data source from the first mode to the second mode such that the data source sends repeat data frames to the computer system.

30. A computer system as recited in claim 25, wherein the means for directing further comprises:

means for calculating a low threshold to indicate that the output data queue will become empty of captured data within the second transition time;

means for detecting that a number of buffers in the output data queue is equal to a number indicated by the low threshold; and responsive to detecting, means for transitioning the data source from the second mode to the first mode such that the data source sends sequential and unique data frames to the computer system.

* * * * *